United States Patent
Lyu

(10) Patent No.: US 12,031,869 B1
(45) Date of Patent: Jul. 9, 2024

(54) TEMPERATURE MEASUREMENT DEVICE

(71) Applicant: BBQOVN INC., New Castle, DE (US)

(72) Inventor: Zhibin Lyu, New Castle, DE (US)

(73) Assignee: BBQOVN INC., New Castle, DE (US)

( * ) Notice: Subject to any disclaimer, the term of this patent is extended or adjusted under 35 U.S.C. 154(b) by 0 days.

(21) Appl. No.: 18/412,577

(22) Filed: Jan. 14, 2024

(30) Foreign Application Priority Data

Jan. 2, 2024 (CN) .......................... 202410012905.4

(51) Int. Cl.
| | |
|---|---|
| *G01K 1/024* | (2021.01) |
| *G01D 11/24* | (2006.01) |
| *G01K 1/022* | (2021.01) |
| *G01K 1/08* | (2021.01) |

(52) U.S. Cl.
CPC ........... *G01K 1/022* (2013.01); *G01D 11/245* (2013.01); *G01K 1/08* (2013.01); *G01K 2207/02* (2013.01); *G01K 2215/00* (2013.01)

(58) Field of Classification Search
CPC ...... G01K 1/022; G01K 1/08; G01K 2207/02; G01K 2215/00; G01D 11/245
See application file for complete search history.

(56) References Cited

U.S. PATENT DOCUMENTS

| | | | | |
|---|---|---|---|---|
| 3,974,696 A | * | 8/1976 | Fitzmayer ................. | F24C 7/02 374/185 |
| 3,975,720 A | * | 8/1976 | Chen ..................... | H05B 6/6447 374/E7.031 |
| 4,716,411 A | * | 12/1987 | Nakamura ............. | G01K 1/024 374/E1.004 |
| 5,938,619 A | * | 8/1999 | Dogre Cuevas ..... | A61B 5/0008 600/549 |
| 6,568,848 B1 | * | 5/2003 | Chapman ............... | G01K 1/024 374/E1.004 |
| 7,566,168 B2 | * | 7/2009 | Rund ....................... | G01K 3/00 374/102 |
| 11,252,581 B2 | * | 2/2022 | Subasic ............... | H04W 52/242 |
| 2003/0007544 A1 | * | 1/2003 | Chang ..................... | F24C 7/08 374/149 |

(Continued)

FOREIGN PATENT DOCUMENTS

| | | | |
|---|---|---|---|
| CN | 204723035 U | * | 10/2015 |
| CN | 110672219 A | | 1/2020 |

(Continued)

OTHER PUBLICATIONS

18412577_2024-03-18_CN_204723035_U_H.pdf,Oct. 28, 2015.*
18412577_2024-03-18_CN_215865557_U_H.pdf,Feb. 18, 2022.*
18412577_2024-03-18_CN_219890607_U_H.pdf,Oct. 24, 2023.*

*Primary Examiner* — Gail Kaplan Verbitsky

(74) *Attorney, Agent, or Firm* — Nitin Kaushik

(57) ABSTRACT

The temperature measurement device provided by the present disclosure includes: a thermometer comprising: a casing, a first power module, a temperature sensing module, a first communication module, and a first antenna module located within the casing; a booster comprising a housing, a second power module, a second communication module, and a second antenna module located within the housing; wherein, the thermometer is connected to the booster by communication, and the booster amplifies signals of the thermometer and charges the thermometer.

18 Claims, 5 Drawing Sheets

(56) References Cited

U.S. PATENT DOCUMENTS

| | | | |
|---|---|---|---|
| 2004/0098068 A1* | 5/2004 | Carbunaru | A61N 1/37276 607/60 |
| 2004/0190592 A1* | 9/2004 | Lojen | G01K 15/00 374/185 |
| 2005/0141637 A1* | 6/2005 | Domokos | H03F 1/3294 375/296 |
| 2008/0082282 A1* | 4/2008 | Duarte | G01K 7/015 374/45 |
| 2013/0203403 A1* | 8/2013 | Cook | H04W 24/02 455/423 |
| 2015/0168232 A1* | 6/2015 | Chu | G01K 1/12 374/208 |
| 2018/0248676 A1* | 8/2018 | Raggio | H04W 72/21 |
| 2019/0049314 A1* | 2/2019 | Chu | G01K 13/00 |
| 2019/0123805 A1* | 4/2019 | Zhan | H04Q 1/08 |

FOREIGN PATENT DOCUMENTS

| | | | |
|---|---|---|---|
| CN | 210322026 U | | 4/2020 |
| CN | 211452639 U | | 9/2020 |
| CN | 215865557 U | * | 2/2022 |
| CN | 219890607 U | * | 10/2023 |

* cited by examiner

TEMPERATURE MEASUREMENT DEVICE

CROSS-REFERENCE TO RELATED APPLICATIONS

The application claims the priority of a Chinese patent application CN 2024100129054 with a filing date on Jan. 2, 2024, and its entire content is incorporated by reference into the application.

TECHNICAL FIELD

The present disclosure relates to a field of temperature measurement, and more specifically, to a temperature measurement device.

BACKGROUND

Thermometer is advantageous for cooking. For example, using a thermometer can prompt users about food cooking information, such as whether the food has been cooked or whether the current temperature is suitable for cooking that type of food. However, these traditional food thermometers often are often not sensitive to heat, such as long waiting times for temperature measurement and short signal transmission distances.

SUMMARY

In view of the above and other further concepts, the present disclosure is proposed. According to one aspect of the present disclosure, there is provided a temperature measurement device comprising:
  a thermometer, comprising a casing, a first power module, a temperature sensing module, a first communication module, and a first antenna module located within the casing; and
  a booster, comprising a housing, a second power module, a second communication module, and a second antenna module located within the housing;
  wherein, the thermometer is connected to the booster by communication, and the booster amplifies signals of the thermometer and charges the thermometer, one part of the thermometer is inserted into food during temperature measurement, to protect the first power module and the first communication module by food.

In one embodiment, the first power module is located in a tip section of the casing, a portion of the temperature sensing module extends from a middle section to the tip section of the casing, and contacts with an inner wall of the casing, and the first communication module is located in the middle section of the casing, the first antenna module is located in a top section opposite to the tip section and extends towards the middle section.

In one embodiment, the temperature sensing module has an elastic body, which extends from the middle section to the tip section of the casing and abuts against the inner wall of the casing.

In one embodiment, the thermometer further comprises an electrode module, wherein the electrode module comprises a negative electrode and a positive electrode, the casing acts as the negative electrode, the positive electrode comprises a charging pin, and one end of the charging pin is electrically connected to the first power module.

In one embodiment, the first antenna module is a hollow copper tube, and the charging pin is located inside the first antenna module and is coaxial with the first antenna module.

In one embodiment, the second communication module is connected to the first communication module by communication, and the second antenna module comprises a signal amplifier module and a dual antenna module, the second antenna module is configured to receive and filter signals from the thermometer, or transmit signals amplified by the signal amplifier module.

In one embodiment, the thermometer comprises a ceramic handle, an upper end of the first antenna module is connected to a lower end of the ceramic handle, the charging pin runs through the ceramic handle, and signals of the first communication module are transmitted by the first antenna module through the ceramic handle.

In one embodiment, the charging pin has a cylindrical body and a stop plate connected to one end of the cylindrical body, the ceramic handle has a stop-plate accommodation chamber at one end away from the first antenna module, and has an internal channel through which the cylindrical body of the charging pin penetrates, the stop plate is accommodated in the stop-plate accommodation chamber, the stop plate contacts with one end of an elastic device, and the stop-plate accommodation chamber is equipped with an upper cover, a lower end of the upper cover contacts with other end of the elastic device away from the stop plate.

According to another aspect of the present disclosure, there is provided a temperature measurement device comprising:
  a thermometer comprising: a casing, wherein the casing has a tip section, a middle section, and a top section adjacent to the middle section and opposite to the tip section of the casing,
  a first power module, a temperature sensing module, a first communication module, and a first antenna module located within the casing,
  wherein, the first power module is located in a tip section of the casing, the first communication module is located in the middle section of the casing, and the first antenna module is located in a top section opposite to the tip section and extends towards the middle section;
  a booster, wherein the thermometer is connected to the booster by communication, and the booster amplifies signals of the thermometer and charges the thermometer, and the tip section of the thermometer is inserted into food during temperature measurement, to protect the first power module and the first communication module by food.

According to another aspect of the present disclosure, there is provided a temperature measuring device comprising a thermometer, wherein the thermometer has a casing, wherein the casing has a tip section, a middle section, and a top section adjacent to the middle section and opposite to the tip section of the casing,
  a first power module, a temperature sensing module, a first communication module, and a first antenna module located within the casing,
  a booster, wherein the thermometer is connected to the booster by communication, and the booster amplifies signals of the thermometer and charges the thermometer,
  wherein, the temperature sensing module includes a food temperature sensor located in the tip section, a safety-line temperature sensor located in the middle section, and an ambient temperature sensor located in the top section,
  the temperature measurement device is equipped with a flipping algorithm, which is configured to determine timing and maturity of food flipping based on temperature measured by the food temperature sensor and the safety-line temperature sensor.

Further embodiments of the present disclosure can also achieve other advantageous technical effects not listed one by one, which may be partially described in the following text and can be expected and understood by those skilled in the art after reading the present disclosure.

BRIEF DESCRIPTION OF DRAWINGS

In order to provide a clearer explanation of the technical solution in the embodiments of the present disclosure, a brief introduction will be given below to the accompanying drawings required in the embodiments or prior art descriptions. It is evident that the accompanying drawings in the following description are only some embodiments of the present disclosure. For those skilled in the art, other accompanying drawings can be obtained based on these drawings without creative labor.

DETAILED DESCRIPTION OF THE EMBODIMENTS

A more detailed description of the present disclosure will be provided with reference to specific embodiments of the present disclosure.

Thermometer

Figure 1:
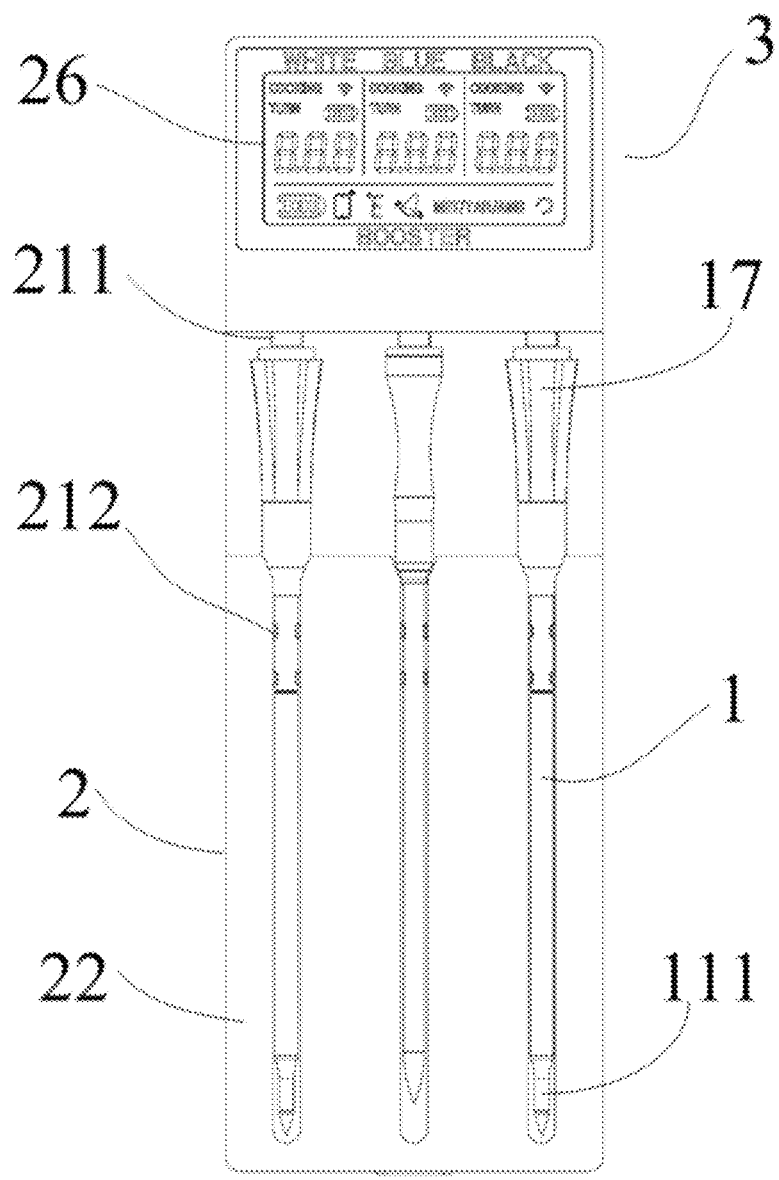
FIG. 1 shows the temperature measurement device of the present disclosure.
Figure 2:
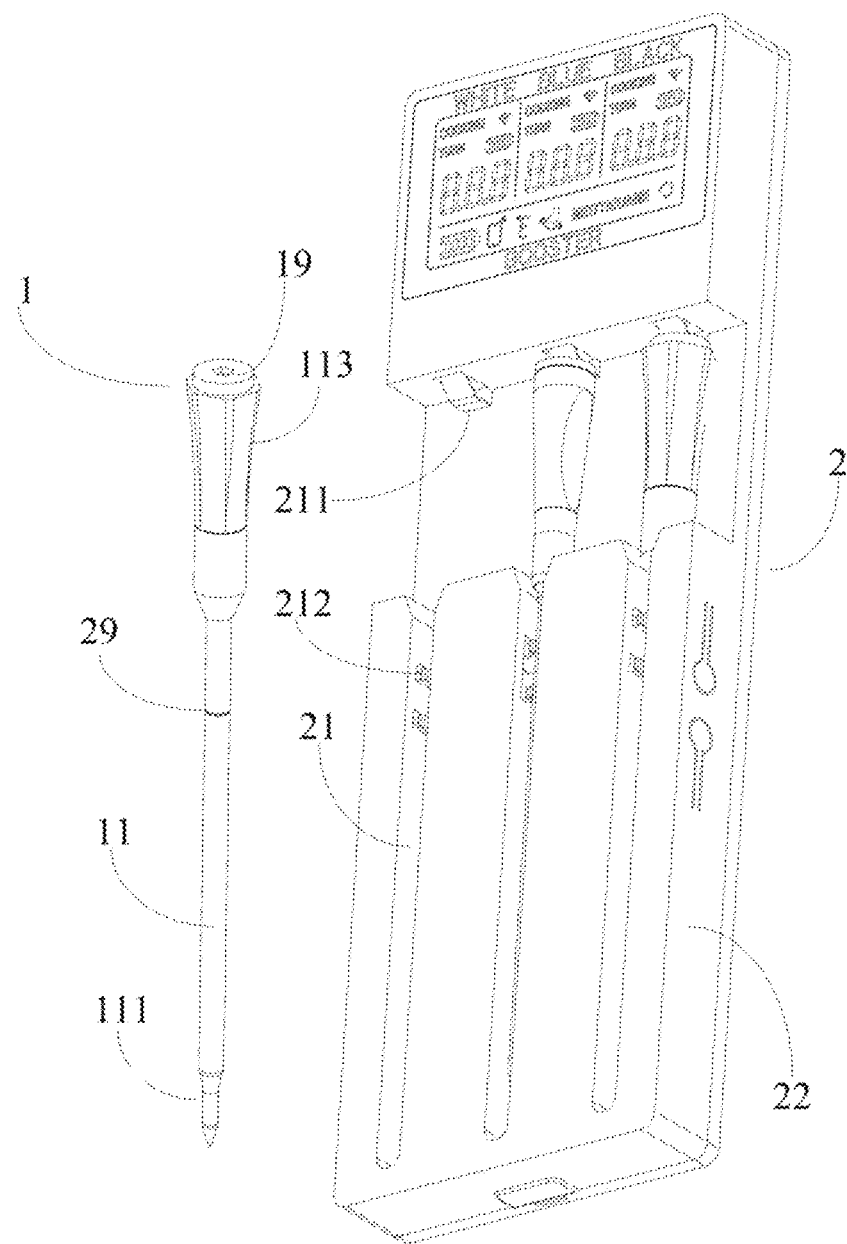
FIG. 2 shows the temperature measurement device shown in FIG. 1.
Figure 3:
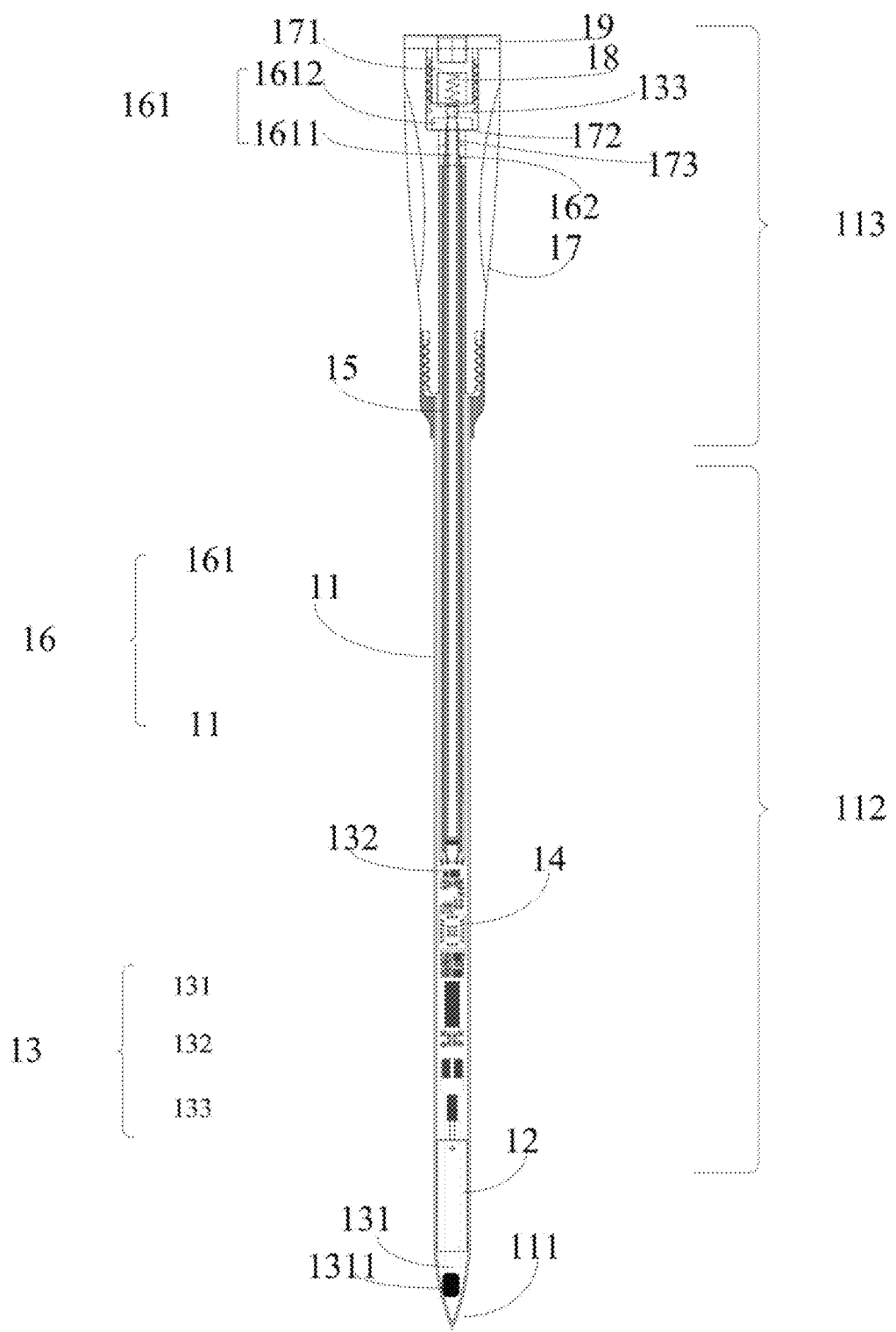
FIG. 3 shows the internal structure of the thermometer shown in FIG. 2.

As shown in FIG. 1-3, the thermometer 1 has a casing 11 and electronic components located inside the casing 11. The electronic components include a first power module 12, a temperature sensing module 13, a first communication module 14, a first antenna module 15, and an electrode module 16.

The casing 11 of the thermometer 1 has a cylinder body with an inner cavity and a tip section 111 located at one end of the cylinder body. In one embodiment, the other end opposite to the tip section 111, i.e. the top section 113, can be connected to a ceramic handle 17. The high-temperature resistant ceramic part is exposed to high-temperature air which is much higher than that in the tip section 111 inserted into the food during temperature measurement. In addition, the ceramic handle 17 is insulated.

The first power module 12, the temperature sensing module 13, the first communication module 14, the first antenna module 15, and the electrode module 16 are located in the cavity of the casing 11. The first power module 12 is located in the tip section 111 of the casing 11, because the tip section 111 is inserted into the food and cooled down by the food, which avoids damaging the electronic components of the tip due to high air temperature during the temperature measurement of the thermometer. The temperature sensing module 13 is used to measure the ambient temperature and the internal temperature of food. The temperature sensing module 13 and the first communication module 14 can be located on the printed circuit board in the middle section 112 of the casing 11. Optionally, a portion of the temperature sensing module 13 extends from the middle section 112 of the casing 11 to the tip section 111 of the casing 11 and abuts against an inner wall of the casing 11. Optionally, the temperature sensing module 13 may include a food temperature sensor 131 located in the tip section 111, a safety-line temperature sensor 132 located in the middle section 112, and an ambient temperature sensor 133 located in the top section 113.

In one embodiment, a safety line 29 is provided in the middle section 112 of the casing 11 of the thermometer 1, and a safety-line temperature sensor 132 is provided at the location of the safety line 29. The safety-line temperature sensor 132 is used to detect whether the safety line 29 is located in the food. During food baking, when the safety line 29 is not in the food, the temperature detected by the safety-line temperature sensor 132 is the air temperature in the oven, which will be much higher than the safety threshold and an alarm will be initiated. During food baking, when the safety line 29 is located in the food, the temperature detected by the safety-line temperature sensor 132 is the internal temperature of the food, which is close to the safety threshold, and an alarm will not be initiated.

In one embodiment, the temperature sensing module 13 includes a food temperature sensor 131 located in the tip section 111, which has an elastic body 1311. The elastic body 1311 extends from the middle section 112 of the casing 11. i.e. the printed circuit board, to the tip section 111 of the casing 11 and makes the temperature sensing module 13 abut against the casing 11. This is beneficial for improving long waiting time for temperature measurement. The metal casing 11 is used as a good conductor of heat and can quickly transfer heat to the food temperature sensor 131. The first communication module 14 is located in the middle section 112 of the casing 11, and the first antenna module 15 is located in the middle section 112 and extends towards the top section 113 opposite to the tip section 111 of the casing 11. The first communication module 14 is connected to the first antenna module 15. When the food temperature is measured by the temperature sensing module 13, the temperature sensing module 13 transmits information to the first communication module 14 and transmits the information through the first antenna module 15. As mentioned above, the other end opposite to the tip section 111 of the casing 11, i.e. the top section 113, can be connected to a ceramic handle 17. The first antenna module 15 is configured to transmit the temperature signal generated by the first communication module 14 from the middle section 112 to the top section 113, and to transmit the information through the ceramic handle 17.

The electrode module 16 includes a negative electrode and a positive electrode. The casing 11 of the thermometer 1 can act as the negative electrode, and the negative electrode of the first power module 12 is connected to the casing 11 through an elastic metal sheet installed on the circuit board. The positive electrode includes a charging pin 161, one end of which is connected to the printed circuit board and then electrically connected to the first power module 12. The charging pin 161 has a cylindrical body 1611 and a stop plate 1612 connected to one end of the cylindrical body 1611. The ceramic handle 17 has a stop-plate accommodation chamber 171, a stop structure 172, and an internal channel 173 through which the cylindrical body 1611 of the charging pin 161 penetrates. The stop-plate accommodation chamber 171 accommodates the stop plate 1612, and the stop plate 1612 is pressed downwards against the stop structure 172. The upper surface of the stop plate 1612 contacts with the elastic device 18, such as one end of a spring. The stop-plate accommodation chamber 171 is covered with an upper cover 19, and the lower end of the upper cover 19 contacts with the other end of the elastic device 18 away from the stop plate 1612. Preferably, the upper cover 19 can be made of conductive metals. In one embodiment, the upper cover 19 may be provided with electrode contacts. The electrode contacts are connected to the charging pin 161 through an elastic device 18. The ceramic handle 17 is cylindrical and several grooves are provided on the side of the ceramic handle to reduce the loss of signals passing through the ceramic handle 17.

The first antenna module 15 extends from the circuit board in the middle section 112 towards the top section 113, and the top of the first antenna module 15 is connected to the lower end of the ceramic handle 17. For example, the lower end of the ceramic handle 17 can be connected threadedly to the top of the first antenna module 15. The electrode module 16 is located in the top section 113 and extends towards the middle section 112. The charging pin 161 runs through the ceramic handle 17. Specifically, a portion of the cylindrical body 1611 of the charging pin 161 is located in the internal channel 173 of the ceramic handle 17, while another portion of the cylindrical body 1611 of the charging pin 161 is located inside the first antenna module 15 and is coaxial with the first antenna module 15. The charging pin 161 is not in contact with the first antenna module 15. The first antenna module 15 can be a hollow copper tube. Hollow copper tubes are used as copper tube antennas. The charging pin 161 does not contact with the first antenna module 15 and extends to the circuit board in the middle section 112.

In one embodiment, as shown in FIG. 3, the ambient temperature sensor 133 is located in the top section 113 and two wires 162 act as the positive and negative poles of the ambient temperature sensor 133. Wires 162 pass through the internal channel 173 and are arranged in parallel within the first antenna module 15 and connected to the circuit board in the middle section 112.

Booster

As shown in FIG. 1, the booster 2 has one or more slots 21 for accommodating the thermometer 1. Each of the slots 21 can have a first contact pin 211 and a second contact pin 212. When the thermometer 1 is placed in the slot 21, the upper cover 19 of the thermometer 1 or the electrode contacts on the upper cover 19 contact with the first contact pin 211. The middle section 112 of the thermometer 1 contacts with the second contact pin 212, which can be divided into first and second parts for clamping thermometer 1. The first contact pin 211 and the second contact pin 212 can be used for charging thermometer 1, while also used for clamping the thermometer 1. When the thermometer 1 is placed in the slot 21, the first and second parts contact with the metal casing 11 of the thermometer 1 to form an electrical signal, thereby determining whether thermometer 1 is placed in the slot 21.

Figure 4:
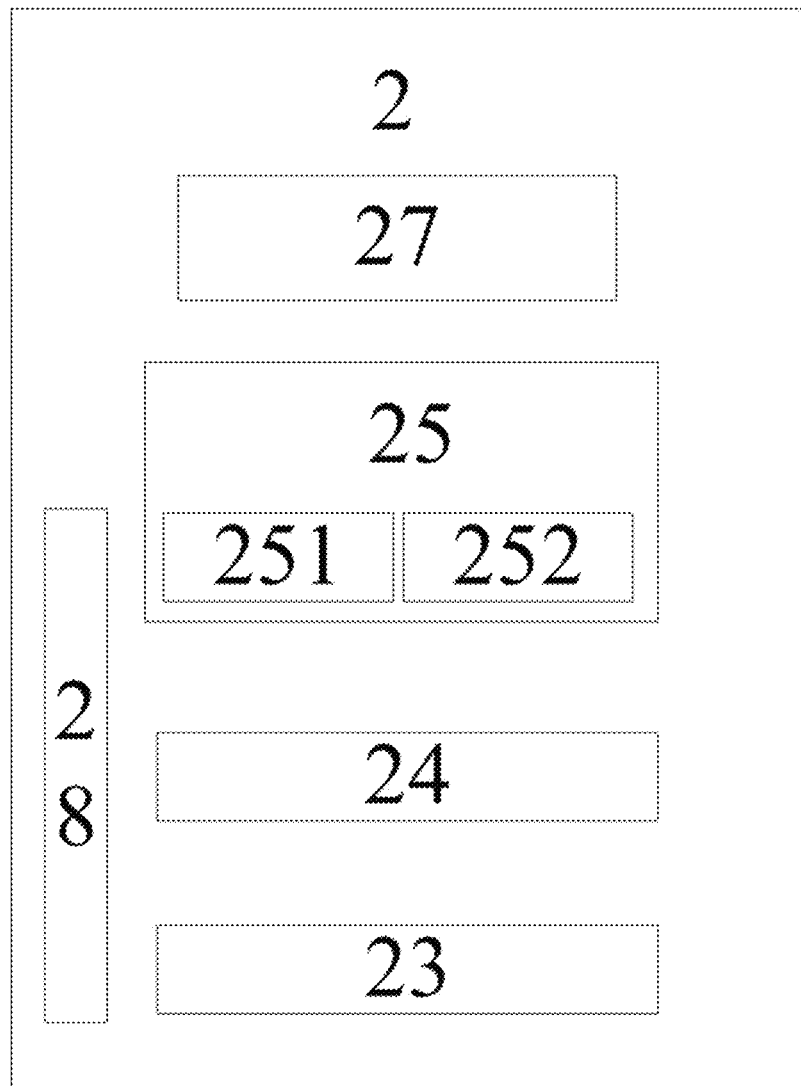
FIG. 4 shows the several modules of the booster.

As shown in FIGS. 1 and 4, the booster 2 has a housing 22, a second power module 23, a second communication module 24, and a second antenna module 25. The second power module 23, the second communication module 24, and the second antenna module 25 are all located inside the housing 22. The second power module 23 is connected to the first contact pin 211 and the second contact pin 212, and can be used for charging thermometer 1. The second communication module 24 can be located on the printed circuit board of the booster 2, such as Bluetooth or WIFI, which can used for receiving and transmitting signals. The second communication module 24 can also be connected to the internet, suitable for remote operation and monitoring by users.

The second antenna module 25 includes a signal amplifier module 251 and a dual antenna module 252 connected to the signal amplifier module 251. The distance between the two sets of antennas of the dual antenna module 252 is appropriate, which can receive multiple paths of signals. The signal is processed by a signal processor, such as weighting or adding, to reduce signal interference and attenuation, and improve the stability and reliability of wireless communication. The second antenna module 25 is configured to receive and filter signals from the thermometer 1, or transmit signals amplified by signal amplifier module 251.

In one embodiment, the booster 2 may be equipped with a display screen 26 for displaying the temperature, power, and service time transmitted in real time by the thermometer 1. In another embodiment, the booster 2 can be connected to a mobile device through a second communication module 24, such as Bluetooth or WIFI. Users can obtain food temperature based on the temperature displayed on the booster 2 for local operation. When users need to stay away from thermometer 1 or booster 2, they can wirelessly connect to booster 2 through a mobile device to remotely obtain food temperature.

In one embodiment, the booster 2 may be configured with a solar energy module 27 for charging the second power module 23.

In one embodiment, the booster 2 may be configured with a battery management system 28 for managing the charging and discharging of the battery. For example, when the battery voltage is below 3.3 volts, the battery management system controls the battery to stop discharging, or controls the battery to stop charging to avoid overcharging.

Temperature Measurement Device

As shown in FIG. 1, the temperature measurement device 3 includes the thermometer 1 and the booster 2. The thermometer 1 is connected to the booster 2 by communication, and the signal of the thermometer 1 is amplified by booster 2.

Specifically, the second communication module 24 is connected to the first communication module 14 by communication. When the second communication module 24 receives the signal from the first communication module 14, the signal is processed and then transmitted to the signal amplifier module. The signal is then transmitted by the second antenna module 25. The signals of the thermometer 1 is transferred to booster 2 during temperature measurement. The signals will not be attenuated because the booster 2 is placed outside the furnace during temperature measurement. In addition, the booster 2 is not limited in its volume, and its battery has a higher power, which can provide strengthened antenna signals.

Figure 5:
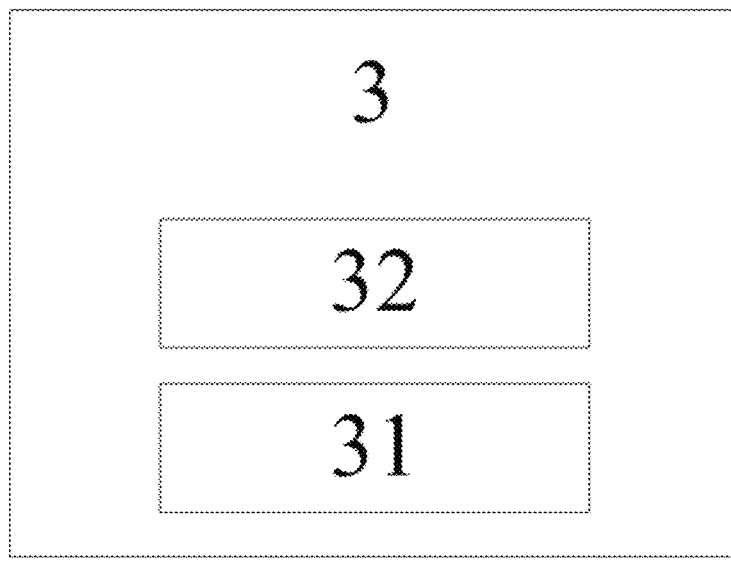
FIG. 5 shows some modules of the temperature measurement device.

In one embodiment, as shown in FIG. 5, the booster 2 further includes a processor 31. The processor 31 is configured to filter the signal received by the second antenna module 25 from thermometer 1 or amplify the signal to be transmitted.

In one embodiment, the temperature measurement device 3 is equipped with a flipping algorithm. The flipping algorithm is executed by temperature sensors located in the tip section 111 of the thermometer 1 and the safety line. The system obtains the internal temperature of the food in the tip section 111 and the safety line 29, and combines the heating time to fit the actual temperature time curve. Based on this actual temperature-time curve, the pre-stored theoretical heating curve is retrieved to obtain the temperature value and curve slope when the food needs to be flipped, and determine the timing of flipping the food, and provides the corresponding maturity. Preferably, the flipping algorithm and theoretical heating curve can be configured in an application that matches the temperature measurement device 3.

In one embodiment, as shown in FIG. 5, the booster 2 further includes a memory 32, which stores executable instructions. When the booster 2 detects a signal disconnection between the thermometer 1 and booster 2 within a certain period of time, the available commands will prompt booster 2 to reconnect with thermometer 1.

The above is only a preferred embodiment of the present disclosure and is not intended to limit it. Any modifications, equivalent substitutions, and improvements made within the spirit and principles of the present disclosure shall be included within the scope of protection of the present disclosure.

What is claimed is:

1. A temperature measurement device, comprising:
   a thermometer, comprising a casing, a first power module, a temperature sensing module, a first communication module, and a first antenna module located within the casing; and
   a booster, comprising a housing, a second power module, a second communication module, and a second antenna module located within the housing;
   wherein, the thermometer is connected to the booster by communication, and the booster amplifies signals of the thermometer and charges the thermometer, one part of the thermometer is inserted into food during temperature measurement,
   wherein the first power module is located in a tip section of the casing, a portion of the temperature sensing module extends from a middle section to the tip section of the casing, and contacts with an inner wall of the casing, and the first communication module is located in the middle section of the casing, the first antenna module is located in a top section opposite to the tip section and extends towards the middle section.

2. The temperature measurement device of claim 1, wherein the temperature sensing module has an elastic body, which extends from the middle section to the tip section of the casing and abuts against the inner wall of the casing.

3. The temperature measurement device of claim 1, wherein the thermometer further comprises an electrode module, wherein the electrode module comprises a negative electrode and a positive electrode, the casing acts as the negative electrode, the positive electrode comprises a charging pin, and one end of the charging pin is electrically connected to the first power module.

4. The temperature measurement device of claim 3, wherein the first antenna module is a hollow copper tube, and the charging pin is located inside the first antenna module and is coaxial with the first antenna module.

5. The temperature measurement device of claim 1, wherein the second communication module is connected to the first communication module by communication, and the second antenna module comprises a signal amplifier module and a dual antenna module, the second antenna module is configured to receive and filter signals from the thermometer, or transmit signals amplified by the signal amplifier module.

6. The temperature measurement device of claim 4, wherein the thermometer comprises a ceramic handle, an upper end of the first antenna module is connected to a lower end of the ceramic handle, the charging pin runs through the ceramic handle, and signals of the first communication module are transmitted by the first antenna module through the ceramic handle.

7. The temperature measurement device of claim 6, wherein the charging pin has a cylindrical body and a stop plate connected to one end of the cylindrical body, the ceramic handle has a stop-plate accommodation chamber at one end away from the first antenna module, and has an internal channel through which the cylindrical body of the charging pin penetrates, the stop plate is accommodated in the stop-plate accommodation chamber, the stop plate contacts with one end of an elastic device, and the stop-plate accommodation chamber is equipped with an upper cover, a lower end of the upper cover contacts with other end of the elastic device away from the stop plate.

8. The temperature measurement device of claim 3, wherein the booster has one or more slots for accommodating the thermometer, wherein each of the slot is provided with a first contact pin and a second contact pin, and when the thermometer is placed in the slot, the first contact pin and the second contact pin respectively contact with the positive electrode and the negative electrode of the thermometer and clamp the thermometer in the slot.

9. The temperature measurement device of claim 1, wherein the booster is connected to a mobile device through the second communication module.

10. The temperature measurement device of claim 1, wherein the temperature sensing module comprises a food temperature sensor located in the tip section, a safety-line temperature sensor located in the middle section, and an ambient temperature sensor located in the top section.

11. A temperature measurement device, comprising:
    a thermometer comprising: a casing, wherein the casing has a tip section, a middle section, and a top section adjacent to the middle section and opposite to the tip section of the casing,
    a first power module, a temperature sensing module, a first communication module, and a first antenna module located within the casing,
    wherein, the first power module is located in the tip section of the casing, the first communication module is located in the middle section of the casing, and the first antenna module is located in the top section and extends towards the middle section;
    a booster, wherein the thermometer is connected to the booster by communication, and the booster amplifies signals of the thermometer and charges the thermometer, and the tip section of the thermometer is inserted into food during temperature measurement,
    wherein the thermometer comprises a ceramic handle, and an upper end of the first antenna module is connected to a lower end of the ceramic handle.

12. The temperature measurement device of claim 11, wherein the thermometer further comprises an electrode module, wherein the electrode module comprises a negative electrode and a positive electrode, the casing acts as the negative electrode, the positive electrode comprises a charging pin, and one end of the charging pin is electrically connected to the first power module.

13. The temperature measurement device of claim 12, wherein the first antenna module is a hollow copper tube, the charging pin is located inside the first antenna module and is coaxial with the first antenna module, the charging pin runs through the ceramic handle, and signals of the first communication module are transmitted by the first antenna module through the ceramic handle.

14. The temperature measurement device of claim 13, wherein the charging pin has a cylindrical body and a stop plate connected to one end of the cylindrical body, the ceramic handle has a stop-plate accommodation chamber at one end away from the first antenna module, and has an internal channel through which the cylindrical body of the charging pin penetrates, the stop plate is accommodated in the stop-plate accommodation chamber, and contacts with one end of the elastic device, the stop-plate accommodation chamber is provided with an upper cover, and a lower end of the upper cover contacts with other end of the elastic device away from the stop plate.

15. The temperature measurement device of claim 11, wherein a portion of the temperature sensing module extends from the middle section to the tip section of the casing and abuts against an inner wall of the casing.

16. The temperature measurement device of claim 15, wherein the temperature sensing module has an elastic body, which extends from the middle section to the tip section of the casing and abuts against the inner wall of the casing.

17. The temperature measurement device of claim 11, wherein the booster has a housing, a second power module, a second communication module, and a second antenna module located within the housing.

18. The temperature measurement device of claim 11, wherein the temperature sensing module comprises a food temperature sensor located in the tip section, a safety-line temperature sensor located in the middle section, and an ambient temperature sensor located in the top section, the temperature measurement device is equipped with a flipping algorithm, which is configured to determine timing and maturity of food flipping based on temperature measured by the food temperature sensor and the safety-line temperature sensor.

* * * * *